United States Patent
Wu

(10) Patent No.: US 10,353,317 B1
(45) Date of Patent: Jul. 16, 2019

(54) ELECTROSTATIC CHARGING MEMBER

(71) Applicant: Xerox Corporation, Norwalk, CT (US)

(72) Inventor: Jin Wu, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/043,458

(22) Filed: Jul. 24, 2018

(51) Int. Cl.
| | |
|---|---|
| *G03G 15/02* | (2006.01) |
| *C08L 101/02* | (2006.01) |
| *C08K 3/04* | (2006.01) |
| *C08K 5/07* | (2006.01) |
| *C08K 5/00* | (2006.01) |

(52) U.S. Cl.
CPC .......... *G03G 15/0233* (2013.01); *C08K 3/04* (2013.01); *C08K 5/0025* (2013.01); *C08K 5/07* (2013.01); *C08K 2201/001* (2013.01); *C08K 2201/005* (2013.01); *C08L 101/025* (2013.01)

(58) Field of Classification Search
CPC ... G03G 15/0233; C08L 101/025; C08K 3/04; C08K 2201/005; C08K 5/07; C08K 2201/001; C08K 5/0025
See application file for complete search history.

(56) References Cited

U.S. PATENT DOCUMENTS

| | | | |
|---|---|---|---|
| 8,090,298 B2 | 1/2012 | Hoshio et al. | |
| 9,411,255 B1* | 8/2016 | Wu | G03G 15/0233 |
| 9,618,870 B1* | 4/2017 | Hoshio | G03G 15/0216 |
| 9,869,945 B2* | 1/2018 | Wu | G03G 15/0233 |

* cited by examiner

*Primary Examiner* — Hoang X Ngo
(74) *Attorney, Agent, or Firm* — Hoffman Warnick LLC

(57) ABSTRACT

The present teachings described a bias charging member and a method of manufacturing a charging member. The bias charging member includes a conductive core and an outer surface layer disposed on the conductive core. The outer surface layer includes a polycarbamate resin and a polyaldehyde cross-linker.

20 Claims, 1 Drawing Sheet

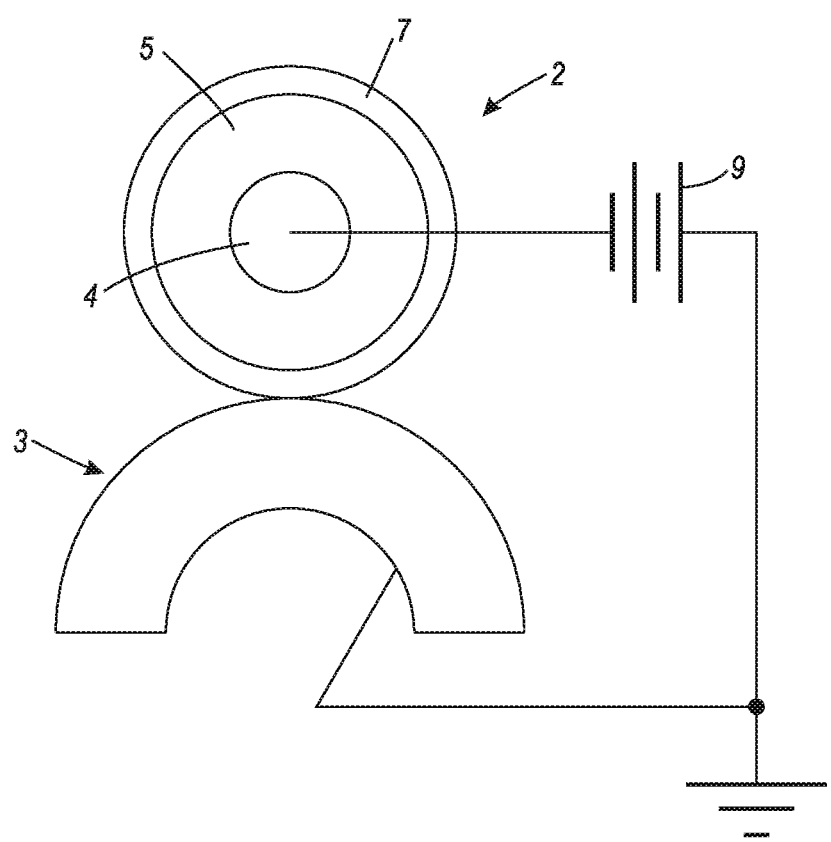

ELECTROSTATIC CHARGING MEMBER

BACKGROUND

Field of Use

The present invention relates to an electrostatic charging member, and more specifically, to an outer surface layer of an electrostatic charging member.

Background

Image forming apparatuses require electrostatic charging of an image holding member by use of an electrostatic charging member or bias charging member. Electrostatic latent images differing from their surroundings in electric potential are formed on the electrostatically charged image holding member. The electrostatic latent images are developed with a developer containing toner, and eventually transferred to a recording material.

Electrostatic charging members are devices having the function of charging electrostatically image holding members and can use contact charging method, wherein the charging member is brought into direct contact with the image holding member to perform electrostatically charge of the image holding members.

The electrostatic charging member is equipped with an electrostatic charging member, such as an electrostatic charging roll, which is brought into direct contact with the surface of an image holding member and made to rotate in synchronization with movement of the image holding member's surface, thereby giving electrostatic charges to the image holding member. The electrostatic charging roll is made up of, e.g., a base material and an elastic conducting layer formed around the peripheral surface of the base material and an outer most layer.

Presently, outermost layers of polyamide resins are disclosed in U.S. Pat. No. 8,090,298. The production and cross-linking of polyamide resins may include formaldehyde(s) and/or isocyanate(s). Formaldehydes and isocyanates are not environmentally friendly.

It would be desirable to provide an outermost layer if an electrostatic charging member that does not include formaldehyde or isocyanate and still provides adequate performance.

SUMMARY

According to an embodiment, there is provided a bias charging member. The bias charging member includes a conductive core and an outer surface layer disposed on the conductive core. The outer surface layer includes a polycarbamate resin and a polyaldehyde cross-linker.

According to an embodiment, there is provided a method of manufacturing a bias charging member. The method includes mixing a carbamate resin, a polyaldehyde cross-linker and an acid catalyst to obtain a solution. A conductive component carbon black and polyamide particles are dispersed in the solution to obtain a dispersion. The dispersion is coated on a bias charging roll substrate. The coating is heating to form an outer surface layer.

According to another embodiment, there is provided a method of manufacturing a bias charging member. The bias charging member includes a conductive core, a base material disposed on the conductive core and an outer surface layer disposed on the base material. The outer surface includes a polycarbamate resin, a polyaldehyde cross-linker, a surface roughness control agent and an acid catalyst.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

FIG. 1 demonstrates an illustrative bias charging roll (BCR) having an electrically conductive core and an outer surface layer according to the disclosure herein provided thereon.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely illustrative.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

Referring to FIG. 1, there is shown an embodiment having a bias charging roller (BCR) 2 held in contact with an image carrier implemented as a photoconductive member 3. However, embodiments herein can be used for charging a dielectric receiver or other suitable member to be charged. The photoconductive member 3 may be a drum, a belt, a film, a drelt (a cross between a belt and a drum) or other known photoconductive member. While the BCR 2 is in rotation, a DC voltage and optional AC current is applied from a power source 9 to an electro-conductive core 4 of the BCR 2 to cause it to charge the photosensitive member 3. Shown in FIG. 1, the electro-conductive core 4 is surrounded by a base material 5. Although shown as one layer, it is possible to eliminate the base material 5 or have multiple layers of base material 5. These layers are referred to as base layers, intermediate layers or substrate layers. The base material 5 for the BCR 2 can be any elastic material with partially conductive or suitable fillers, as discussed below. A partially conductive protective overcoat is provided on the base material 5 of the BCR 2 to form the outer surface layer 7. There may or may not be a filler in the base layer, substrate layer, intermediate layer, and outer surface layer.

The electro-conductive core 4 serves as an electrode and a supporting member of the charging roll, and is composed of an electro-conductive material such as a metal or alloy of aluminum, copper alloy, stainless steel or the like; iron coated with chromium or nickel plating; an electro-conductive resin and the like. The diameter of the electro-conductive core is, for example, about 1 mm to about 20 cm, or from about 5 mm to about 2 cm.

The base material 5 can be isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber (EPDM), acrylonitrile-butadiene copolymer rubber (NBR), natural rubber, and blends thereof. Among these, polyurethane, silicone rubber, EPDM, epichlorohydrin-ethylene oxide copolymer rubber, epichlorohydrin-ethylene oxide-allyl glycidyl ether copolymer rubber, NBR, and blends thereof can be used.

An electro-conductive agent, an electronic electro-conductive agent or an ionic electro-conductive agent may be used in the base materials. Examples of the electronic electro-conductive agent include fine powder of: carbon black such as Ketjen Black and acetylene black; pyrolytic carbon, graphite; various kinds of electro-conductive metal or metal alloy such as aluminum, copper, nickel and stainless steel; various kinds of electro-conductive metal oxide such as tin oxide, indium oxide, titanium oxide, tin oxide-antimony oxide solid solution, and tin oxide-indium oxide solid solution; insulating materials having a surface treated by an electro-conductive process; and the like. Furthermore, examples of the ionic electro-conductive agent include perchlorates or chlorates of tetraethylammonium, lauryltrimethyl ammonium and the like; perchlorates or chlorates of alkali metal such as lithium and magnesium, and alkali earth metal; and the like. These electro-conductive agents may be used alone, or in combination of two or more kinds thereof.

Furthermore, the amount of addition of the electro-conductive agent(s) or ionic electro-conductive agent(s) to the base materials is not particularly limited. For example, the amount of electro-conductive agent to be added is from about 1 to about 30 parts by weight, or from about 5 to about 25 parts by weight with respect to 100 parts by weight of the rubber material. The amount of the ionic electro-conductive agent to be added is in the range of about 0.1 to about 5.0 parts by weight, or from about 0.5 to about 3.0 parts by weight with respect to 100 parts by weight of the rubber material. The layer thickness of the base material 5 is from about 1 mm to about 20 cm, or from about 5 mm to about 3 cm.

The outer surface layer or protective overcoat layer 7 disclosed herein includes; an alkyd polycarbamate resin or an acrylic polycarbamate resin, and a polyaldehyde cross-linker. The coating formulation for the outer most layer is isocyanate free and formaldehyde free, i.e. no isocyanate or isocyanate generators and no added formaldehyde or formaldehyde generators). The thickness of the outer surface layer is from about 0.1 μm to about 500 μm, or from about 1 μm to about 50 μm.

An alkyd polycarbamate resin or an acrylic polycarbamate rein can be prepared from the reaction of an alkyd polyol with urea or an acrylic polyol with urea and a polyaldehyde cross-linker. In embodiments, polyaldehyde cross-linkers include 1, 3-cyclohexanedicarboxaldehyde, 1, 4-cyclohexanedicarboxaldehyde, and the like and/or mixtures thereof.

Formation of polyurethane from reaction of alkyd polycarbamates or acrylic polycarbamates and polyaldehydes can be represented by:

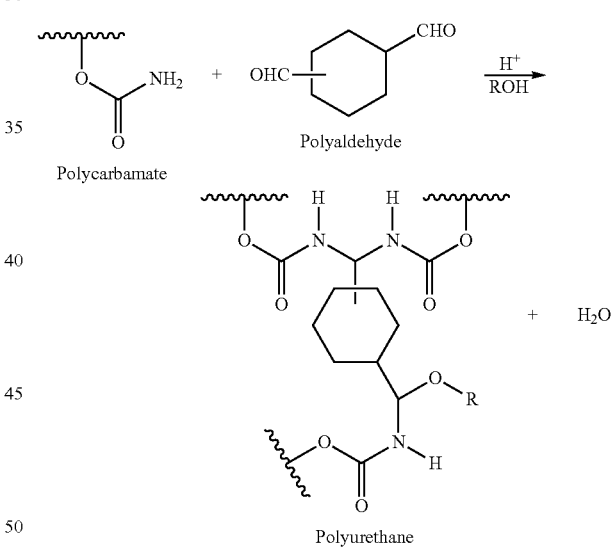

Compared with conventional polyurethane systems, the benefits observed with the disclosed polyurethane coatings are decoupling formulation pot-life from coating dry-time. A primary alcohol (i.e. ethanol, n-propanol) is typically used as a co-solvent to enhance the pot-life of the coating formulation. The hydroxy functionality of the alcohol reacts with the aldehyde functionality of the polyaldehyde cross-linker forming acetal equilibrium products. When the coating is applied on a substrate, the alcohol volatilizes and the aldehyde functionality of the polyaldehyde cross-linker reacts with the carbamate groups of the alkyd polycarbamate resins or the acrylic polycarbamate resins resulting in urethane cross-links.

Commercial alkyd polycarbamates resins are available from Dow Chemical as PARALOID™ EDGE 1311-HP resin (65-69 weight percent in n-butyl acetate, solid carbamate equivalent weight=325-375, $T_g$=31° C., viscosity=22,000 centipoise (cps)), and 1315 resin (58-62 weight percent in xylene/n-butyl acetate, solid carbamate equivalent weight=325-375, $T_g$=31° C., viscosity=18,000 cps).

Commercial acrylic polycarbamates resins are available from Dow Chemical as PARALOID™ EDGE 2595 resin (58-62 weight percent in xylene/n-butyl acetate, solid carbamate equivalent weight=625-675, $T_g$=59° C., viscosity=15,000 cps), and 2301 resin (68-71 weight percent in n-butyl acetate, solid carbamate equivalent weight=550-650, $T_g$=25-30° C., viscosity <30,000 cps).

Commercial polyaldehyde crosslinkers are available from Dow Chemical as PARALOID™ EDGE XL-195 (1,3- and 1,4-cyclohexanedicarboxaldehyde).

The outer surface layer can contain, in addition to the polycarbamate resin and the polyaldehyde cross-linker, a conductive component, a surface roughness control agent, and an acid catalyst. The alkyd polycarbamate resin or acrylic polycarbamate resin is present in an amount of from about 40 to about 95 weight percent, the polyaldehyde cross-linker is present in an amount of from about 2 to 35 weight percent, the wetting agent is present from about 0.1 to about 5 weight percent, the conductive component is present in an amount of from about 5 to about 40 weight percent, the surface roughness control agent is present in an amount of from about 5 to about 30 weight percent, and the acid catalyst is present in an amount of from about 0.1 to about 5 weight percent, and the total is 100 weight percent.

In embodiments, the conductive component can include carbon black, a metal oxide, or a conductive polymer. Examples of the conductive component include fine powder of: carbon black such as Ketjen Black and acetylene black; pyrolytic carbon, graphite; various kinds of electro-conductive metal or metal alloy such as aluminum, copper, nickel and stainless steel; various kinds of electro-conductive metal oxide such as tin oxide, indium oxide, titanium oxide, tin oxide-antimony oxide solid solution, and tin oxide-indium oxide solid solution; insulating materials having a surface treated by an electro-conductive process; and the like. Furthermore, examples of conductive polymers include polythiophene, polyaniline, polypyrrole, polyacetylene and the like. These electro-conductive agents may be used alone, or in combination of two or more kinds thereof. The amount of conductive component in the outer surface is from 0.1 to about 60 weight percent based on the weight of total solids in the outer surface layer. The carbon black conductive components that can be incorporated into the outermost layer include MONARCH® 1000, EMPEROR® E1200, both obtained from Cabot Corp.

The surface roughness control agent may include porous polyamide fillers (for modifying outermost layer surface morphology). Polyamide 12 powders having varying average diameters of 5 microns (ORGASOL® 2001UDNAT1) or 10 microns (ORGASOL® 2001EXDNAT1) are suitable to control morphology and are available from Arkema.

The surface roughness ($R_z$) of the outer surface layer 7 (FIG. 1) is in a range of about 2 microns to about 20 microns, or in embodiments in a range of about 4 microns to about 18 microns or in a range of about 8 microns to about 15 microns. By controlling the surface roughness $R_z$ of the outermost layer to the 2 micron to 20 micron range, the durability of the electrostatic charging member is improved, and outstanding long-term retention of electrostatic charging capability is achieved.

The outer surface layer 7 disclosed herein may include an acid catalyst such as p-toluene sulfonic acid (p-TSA), dinonylnaphthlene sulfonic acid (DNNSA) and dinonylnaphthlene disulfonic acid (DNNDSA).

The composition for manufacturing the outer surface layer 7 disclosed herein may include solvents such as acetates, ketones, glycol ether acetates and xylene, and at least one primary alcohol such as ethanol, n-propanol and n-butanol as both co-solvent and a polyaldehyde cross-linker blocker for extending formulation pot-life. The composition disclosed herein is formaldehyde free and isocyanate free.

The bulk and surface conductivity of the outer surface layer 7 should be higher than that of the BCR 2 to prevent electrical drain on the BCR 2, but only slightly more conductive. Surface layers 7 with from about $1\times10^2$ ohm/☐ to about $1\times10^{12}$ ohm/☐, of from about $1\times10^4$ ohm/☐ to about $1\times10^8$ ohm/☐, or from about $1\times10^5$ ohm/☐ to about $1\times10^6$ ohm/☐ surface resistivity were found to be suitable.

A dispersion of the outer surface layer is prepared by mixing the alkyd polycarbamate resin of the acrylic polycarbamate resin with the polyaldehyde cross-linker with an acid catalyst to obtain a solution. The acid catalyst is optional. Polyamide particles and conductive components can be added the solution and the solution can be ball milled to create a dispersion. The dispersion is filtered. In embodiments, a paint filter can be utilized to filter the dispersion. The dispersion is then coated on the BCR 2. The coating is cured at a temperature of about 25 to about 200° C., or from about 100 to about 180° C., for about 10 to about 120 minutes, or from about 25 to 65 minutes. Typical coating techniques include dip coating, roll coating, spray coating, rotary atomizers, ring coating, die casting, flow coating and the like.

EXAMPLES

Example 1

An outer surface layer dispersion was prepared as follows:

PARALOID™ EDGE 1311-HP resin (an alkyd polycarbamate resin from Dow Chemical, 78 parts), was mixed with PARALOID™ EDGE XL-195 (a polyaldehyde crosslinker from Dow Chemical, 20 parts) and p-toluene sulfonic acid (2 parts) in a n-butyl acetate/ethanol solution (61/39 weight percent) to obtain a polymeric base solution.

Carbon black (EMPEROR® E1200 available from CABOT at 20 weight percent) and 15 weight percent polyamide filler (ORGASOL® 2001UDNAT1 with an average diameter of 5 microns from Arkema) was added to the polymeric base solution to create a dispersion. The dispersion was ball milled with 2 mm stainless steel shot for 20 hours at 200 rpm. The ball milled dispersion was filtered through a paint filter to obtain the final outer surface layer coating dispersion. The outer surface layer coating dispersion was coated onto a BCR base (from ENBI) using a Tsukiage Dip coater, and subsequently cured coating at 160° C./30 minutes to obtain a 10-micron thick outermost layer.

The BCR outer surface layer was tested for key physical properties including surface resistivity of about $2.2\times10^7$ ohm/☐ and surface roughness $R_z$ of 8.2 μm, and the surface morphology was monitored using optical microscope and there were no cracks in the outer surface layer. The resulting BCR having the outer surface layer disclosed herein was print tested with satisfactory image quality and service life.

Example 2

An outer surface layer dispersion was prepared as follows:

PARALOID™ EDGE 2595 resin (an acrylic polycarbamate resin from Dow Chemical, 87 parts) was mixed with PARALOID™ EDGE XL-195 (a polyaldehyde crosslinker from Dow Chemical, 11 parts) and p-toluene sulfonic acid (2 parts) in a xylene and n-butyl acetate/ethanol solution (65/35 weight percent) to obtain a polymeric base solution.

Carbon black (EMPEROR® E1200 available from CABOT at 20 weight percent) and 15 weight percent polyamide filler (ORGASOL® 2001UDNAT1 with an average diameter of 5 microns from Arkema) was added to the polymeric base solution to create a dispersion. The dispersion was ball milling with 2 mm stainless steel shot for 20 hours at 200 rpm. The ball milled dispersion was filtered through a paint filter to obtain the final outer surface layer coating dispersion. The outer surface layer coating dispersion was coated onto a BCR base (from ENBI) using a Tsukiage Dip coater, and subsequently cured coating at 160° C./30 minutes to obtain a 10-micron thick outer surface layer.

The BCR outer surface layer was tested for key physical properties including surface resistivity of about $1.5 \times 10^7$ ohm/□ and surface roughness $R_z$ of 7.9 μm, and the surface morphology was monitored using optical microscope and there were no cracks in the outer surface layer. The resulting BCR having the outer surface layer disclosed herein was print tested with satisfactory image quality and service life.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A bias charging member comprising:
   a) a conductive core, and
   b) an outer surface layer disposed on the conductive core, the outer surface layer comprising:
      a polycarbamate resin; and
      a polyaldehyde cross-linker.

2. The bias charging member in accordance with claim 1, wherein the outer surface layer further comprises, a conductive component, a surface roughness control agent and an acid catalyst.

3. The bias charging member in accordance with claim 2, wherein the conductive component is selected from a group consisting of: carbon black, metal oxides, and conductive polymers.

4. The bias charging member in accordance with claim 2, wherein the acid catalyst is selected from a group consisting of: p-toulene sulfonic acid, dinonylnaphthlene sulfonic acid and dinonylnaphthlene disulfonic acid.

5. The bias charging member in accordance with claim 2, wherein the surface roughness control agent comprises polyamide particles.

6. The bias charging member in accordance with claim 5, wherein the polyamide particles have an average diameter of from about 2 microns to about 20 microns.

7. The bias charging member in accordance with claim 1, further comprising a base material disposed between the conductive core and the outer surface layer.

8. The bias charging member in accordance with claim 7, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

9. The bias charging member in accordance with claim 1, wherein the polycarbamate resin comprises an alkyd polycarbamate resin.

10. The bias charging member in accordance with claim 1, wherein the polycarbamate resin comprises an acrylic polycarbamate resin.

11. A method of manufacturing a bias charging member, the method comprising:
    mixing a carbamate resin, a polyaldehyde cross-linker and an acid catalyst to obtain a solution;
    dispersing a conductive component carbon black and polyamide particles in the solution to obtain a dispersion;
    coating the dispersion on a bias charging roll substrate; and
    heating the coating to form an outer surface layer.

12. The method of claim 11, further comprising;
    filtering the dispersion prior to coating.

13. The method in accordance with claim 11, wherein the polycarbamate resin comprises an alkyd polycarbamate resin.

14. The method in accordance with claim 11, wherein the polycarbamate resin comprises an acrylic polycarbamate resin.

15. The method of claim 11, wherein the bias charging roll substrate comprises a base material disposed over a conductive core.

16. The method of claim 15, wherein the base material is selected from the group consisting of: isoprene rubber, chloroprene rubber, epichlorohydrin rubber, butyl rubber, polyurethane, silicone rubber, fluorine rubber, styrene-butadiene rubber, butadiene rubber, nitrile rubber, ethylene propylene rubber, epichlorohydrin-ethylene oxide copolymer rubber, epichlorohydrin-ethylene oxide-allyl glycidyl ether copolymer rubber, ethylene-propylene-diene terpolymer copolymer rubber, acrylonitrile-butadiene copolymer rubber (NBR) and natural rubber.

17. The method of claim 11, wherein the heating is at about 100-200° C. for about 10-180 minutes.

18. A bias charging member comprising:
    a) a conductive core,
    b) a base material disposed on the conductive core; and
    c) an outer surface layer disposed on the base material, the outer surface comprising;
       a polycarbamate resin;
       a polyaldehyde cross-linker;
       a surface roughness control agent; and
       an acid catalyst.

19. The bias charging member in accordance with claim 18, wherein the polycarbamate resin comprises an alkyd polycarbamate resin.

20. The bias charging member in accordance with claim 18, wherein the polycarbamate resin comprises an acrylic polycarbamate resin.

* * * * *